April 5, 1949. C. W. KELSEY 2,466,594
MOWING ATTACHMENT FOR ROTARY SOIL TILLERS
Filed June 22, 1945 3 Sheets-Sheet 1

INVENTOR.
Cadwallader W. Kelsey
BY
ATTORNEY

April 5, 1949.  C. W. KELSEY  2,466,594
MOWING ATTACHMENT FOR ROTARY SOIL TILLERS
Filed June 22, 1945  3 Sheets-Sheet 3

INVENTOR.
Cadwallader W. Kelsey
BY
ATTORNEY

Patented Apr. 5, 1949

2,466,594

UNITED STATES PATENT OFFICE 2,466,594

MOWING ATTACHMENT FOR ROTARY SOIL TILLERS

Cadwallader W. Kelsey, Troy, N. Y.

Application June 22, 1945, Serial No. 600,968

6 Claims. (Cl. 56—26.5)

1

My invention relates to rotary soil tillers and particularly to a mowing attachment therefor.

The principal object of my invention is to provide a unitary mower which may be readily attached to or detached from the front of a rotary soil tiller; and, more specifically, to provide a device of this character including a casing enclosing the driving mechanism for the mower and having a portion adapted to replace the usual front cover for the motor blower housing; whereby said mower may be attached and operatively connected to the tiller motor by merely removing said cover and bolting on the mower casing in place thereof.

I accomplish these objects by means of the novel elements and the combinations and arrangements thereof described below and illustrated in the accompanying drawings in which—

Figure 1:
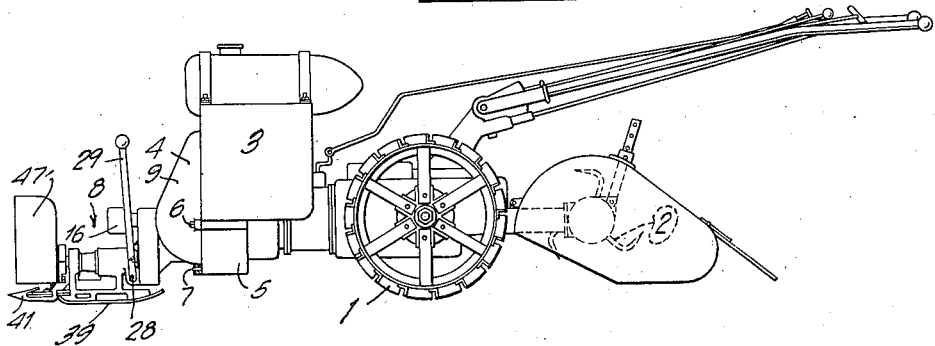
Fig. 1 is a more or less conventional side elevation of a rotary soil tiller with my mowing attachment thereon.

The tiller, as illustrated in Fig. 1, is provided with the usual ground wheels 1 and the rotary soil working tools 2 which are driven by a motor in the housing 3. The motor, in most instances, is air cooled and the housing therefor is provided with a front cover 4 through which air flows to the blower and which is secured to the blower housing 5 by means of studs 6 and a dowel 7.

Figure 2:
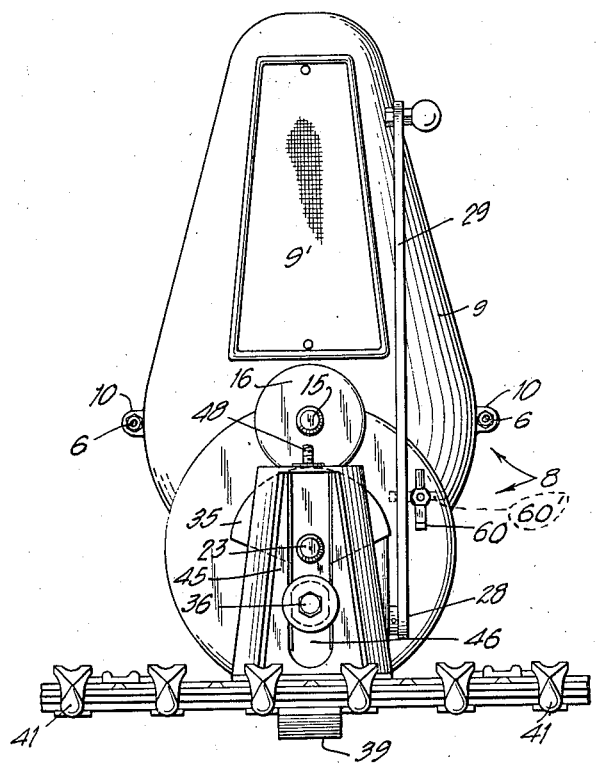
Fig. 2 is a fragmentary front elevation view of the attachment with certain parts removed.
Figure 3:
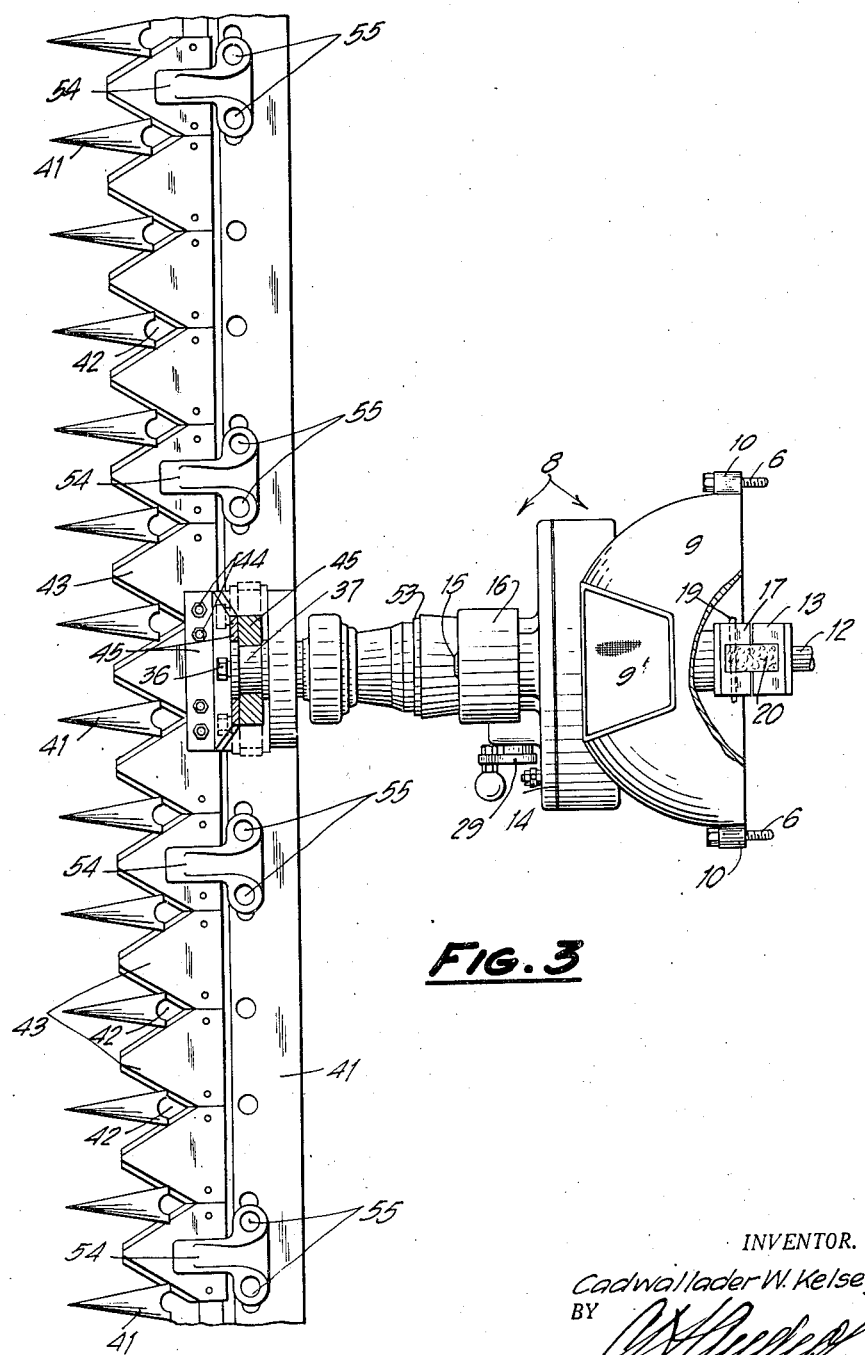
Fig. 3 is a fragmentary top plan view of the attachment with certain parts omitted and certain parts broken away.
Figure 4:
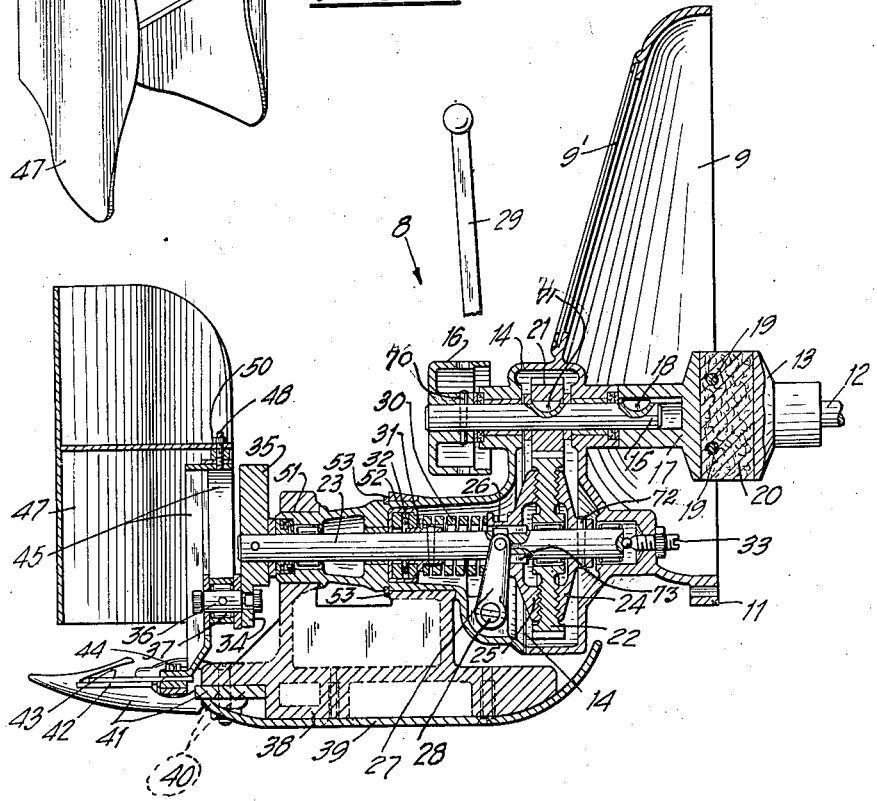
Fig. 4 is a sectional elevation through the center of the attachment.

Referring now to Figs. 2, 3 and 4, my attachment comprises a casing, represented generally by the numeral 8, which includes, as a part thereof, a portion 9 preferably substantially identical, at least in contour, with the front cover of the tiller housing. It is provided with lugs or ears 10 through which pass the studs 6 adapted to secure the attachment to the tiller and which are normally used to hold the front housing cover in place. The portion 9 is also provided with a lug 11 at the bottom thereof adapted to receive the dowel 7 which normally cooperates with the housing cover. The front of the portion 9 is here shown as provided with a screened opening 9' through which air may flow to the blower. 12 (see Figs. 3 and 4) is the motor shaft, and secured thereto is the bifurcated element 13 forming a power take-off at the front of the tiller.

Referring now more particularly to Fig. 4, the casing 8 comprises two portions which may be separated along the line or plane 14 and which are secured together with a gasket therebetween

2 by means, such as bolts, not shown. Rotatively mounted in suitable bearings in the casing is a driving shaft 15 having a pulley 16 pinned thereto at the front end, as shown at 70, for starting the motor and having a bifurcated element 17, best shown in Fig. 3, keyed to the other end thereof, as shown at 18. Secured within the bifurcation by means of pins 19 is a block 20 of yielding material such as leather or rubber which is adapted to be received in the bifurcation of the element 13 in order yieldingly and operatively to connect the shaft 15 to the power take-off. Keyed to the shaft 15 within the housing, as shown at 71, is a driving gear 21 which meshes with a driven clutch gear 22 floating on the driven shaft 23. A fixed clutch element 24 is pinned to the shaft 23, as shown at 72, and a movable clutch element 25 is slidably connected to the shaft 23 by means of a spline 73. The sliding clutch element 25 is provided with a collar 26 which cooperates with a clutch shifting fork 27 pivotally mounted in the casing at 28. The hand lever 29 is provided for shifting the movable clutch element 25, and the lever is held in clutch-disengaged position by turning the cam 60 (see Fig. 2) to the position 60' so that it will lie between the lever 29 and the casing or housing. A clutch spring 30 is biased to hold the sliding clutch member 25 in engagement with the gear 22 and to force the gear 22 into frictional engagement with the fixed clutch member 24. Thus, the gear 22, which floats on the shaft 23 when the clutch is disengaged, is operatively secured to the shaft when the clutch is engaged so that the shaft 23 is turned by the shaft 15 through the gears 21 and 22. The clutch spring is compressed between the clutch collar 26 and a collar 31 which is pinned to shaft 23; the thrust of the collar 31 being taken by the ball thrust bearing 32. End play in the shaft 23 is adjusted by means of the adjusting screw 33.

Pinned to the front end of the shaft which projects beyond the casing is a crank 34 having a counterweight 35 thereon. Secured to the crank is the crank pin 36 which is mounted in a roller bearing 37. The casing is provided with a ground support 38 having a shoe 39 thereon adapted to slide on the ground. The ground support is suspended on bearings 51 and 52 so that it can swing on the housing transversely of the tiller path, and is secured on the bearings by means of a snap ring 53.

Secured to the ground support by means of screws or bolts 40 is a fixed guard bar 41 which, in turn, carries the fixed cutting bar 42. The movable cutting bar (see Fig. 3) has secured thereto a plurality of knives 43 and is held down in sliding contact with the fixed cutting bar by means of the spaced elements 54 which are riveted or otherwise secured to the fixed cutting bar as shown at 55 (see Fig. 3). Secured to the center of the movable cutting bar by means of cap screws 44 (see Fig. 3) is an upstanding element 45 provided with a vertically extending slot or channel 46 in which the crank pin roller bearing 37 rides up and down.

Figure 5:
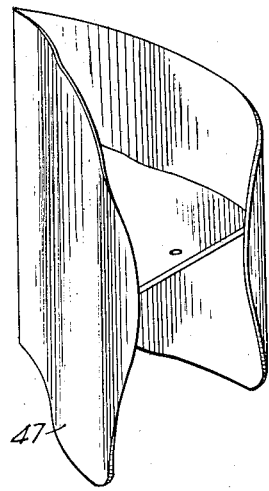
Fig. 5 is a perspective view of a guard.

In order to prevent grass and other foreign matter from entering the channel or slot in the upstanding member 45 a sheet metal guard 47 (see Figs. 4 and 5) is secured to the top of the member 45 by means of the stud 48 and the nut 50.

From the foregoing it will be apparent that when the mowing attachment is secured to the tiller with the shaft 15 in driving engagement with the power take-off, and the clutch in engagement with the gear 22, rotation of the power take-off will cause the shaft 23 to rotate and the crank pin 36 to revolve around the axis of the shaft 23. The crank pin will move up and down in the channel in the member 45 and thus oscillate the member 45 and the movable cutting bar secured thereto back and forth transversely of the path of the tiller. The oscillation of the knives may be stopped by disengaging the clutch by means of the lever 29.

By pendulously supporting the cutting elements on the bearings 51 and 52 on the housing the assembly is adapted to swing transversely of the path of movement of the vehicle and thus follow quite closely the contour of the ground. By positioning the bearings 51 and 52 so that they are coaxial with the shaft 23 the amplitude of the oscillatory movements of the movable cutting bar is maintained constant irrespective of the extent to which the ground support and the cutting bar assembly may swing about the axis of these bearings.

While I have described my device in its preferred embodiment it is to be understood that the words which I have used are words of description rather than of limitation and that changes within the purview of the appended claims may be made without departing from the true scope and spirit of my invention in its broader aspects.

What I claim is—

1. In a unitary mowing device adapted for attachment to a motor propelled vehicle having a driven shaft provided with a power take-off, projecting from the front of said vehicle, the combination with a casing, including a first portion provided with means adapting it to be rigidly but detachably secured to the front of said vehicle around said power take-off, of a second portion of said casing, means pendulously mounting said second portion on said first portion to swing transversely of the path of said vehicle, a plurality of mowing knives and a mounting therefor carried by said second portion on which said knives may oscillate, means for oscillating said knives, and mechanism, including a driving shaft mounted in said first portion of said casing and provided with means adapting it to be directly connected to said power take-off in substantially axial alignment with said driven shaft for actuating said knife-oscillating means.

2. A unitary mowing device adapted for attachment to a motor propelled vehicle having a driven shaft provided with a bifurcated power take-off, projecting from the front of said vehicle; said device comprising the combination with a casing comprising a first portion provided with means adapting it to be rigidly but detachably secured to the front of said vehicle around said power take-off, and a second portion pendulously suspended from said first portion to swing transversely of the path of said vehicle, of a plurality of mowing knives and a mounting therefor on which said knives may oscillate carried by said second portion of said casing, means for oscillating said knives, and mechanism in said casing for actuating said knife-oscillating means, including a driving shaft mounted in said first portion of said casing and provided with means adapted to interfit directly with said power take-off for operatively connecting said driving and driven shafts in substantially coaxial alignment when said device is attached to said vehicle.

3. The structure set forth in claim 2 in which the means adapted to interfit with said power take-off is a yielding means; whereby to form a yielding connection between said driving and said driven shaft to compensate for any minor differences in alignment of said shafts.

4. A unitary mowing device adapted for attachment to a motor propelled vehicle having a driven shaft provided with a power take-off projecting from the front of said vehicle; said device comprising the combination, with a casing having a first portion provided with means adapting it to be rigidly but detachably secured to the front of said vehicle around said power take-off and a second portion pendulously mounted on said first portion to swing about an axis parallel to said driven shaft when said device is attached to said vehicle, of a plurality of slidably cooperating cutting elements carried by said second portion of said casing, mechanism including a first shaft mounted in said casing coaxial with the pendulous mounting of said second portion of said casing for effecting relative oscillatory movements of said cutting elements, a second shaft mounted in said first portion of said casing and provided with means adapting it to be directly connected to said power take-off in coaxial relation to said driven shaft when said device is attached to said vehicle, and gears in said casing operatively connecting said first and second shafts.

5. The structure set forth in claim 4 in which the means adapting said second shaft to be directly connected to said power take-off forms a flexible connection between said shaft and said take-off.

6. The structure set forth in claim 4 including a clutch in said casing operable to connect and disconnect said first and second shafts, and a lever mounted on said casing for actuating said clutch.

CADWALLADER W. KELSEY.

REFERENCES CITED

The following references are of record in the file of this patent:

UNITED STATES PATENTS

| Number | Name | Date |
| --- | --- | --- |
| 1,876,662 | Gravely | Sept. 13, 1932 |
| 2,328,803 | Hayes | Sept. 7, 1943 |
| 2,368,290 | Donald | Jan. 30, 1945 |

FOREIGN PATENTS

| Number | Country | Date |
| --- | --- | --- |
| 251,501 | Germany | Oct. 3, 1912 |